United States Patent [19]
Favata

[11] Patent Number: 5,685,099
[45] Date of Patent: Nov. 11, 1997

[54] TRAILER SIGN FRAME

[76] Inventor: Joseph K. Favata, 8125 Parkerest Dr., Darien, Ill. 60561

[21] Appl. No.: 433,751

[22] Filed: May 4, 1995

[51] Int. Cl.[6] .................................................. G09F 7/18
[52] U.S. Cl. ............................ 40/590; 40/591; 40/603
[58] Field of Search .......................... 40/590, 591, 593, 40/603; 160/378, 371

[56] References Cited

U.S. PATENT DOCUMENTS

| | | | |
|---|---|---|---|
| 4,265,509 | 5/1981 | Brooks | 40/603 |
| 4,452,000 | 6/1984 | Gandy | 40/603 X |
| 4,557,517 | 12/1985 | Bolduc et al. | 40/590 X |
| 4,756,107 | 7/1988 | Hillstrom | 40/590 X |
| 5,301,447 | 4/1994 | Lotter et al. | 160/378 X |

*Primary Examiner*—Kenneth J. Dorner
*Assistant Examiner*—Cassandra Davis
*Attorney, Agent, or Firm*—Patula & Associates

[57] ABSTRACT

A sign system wherein surface mounted signs and sign frames on truck bodies are protected from damage by the use of a protective beveled molding mounted on the outside of the frame of the sign.

20 Claims, 1 Drawing Sheet

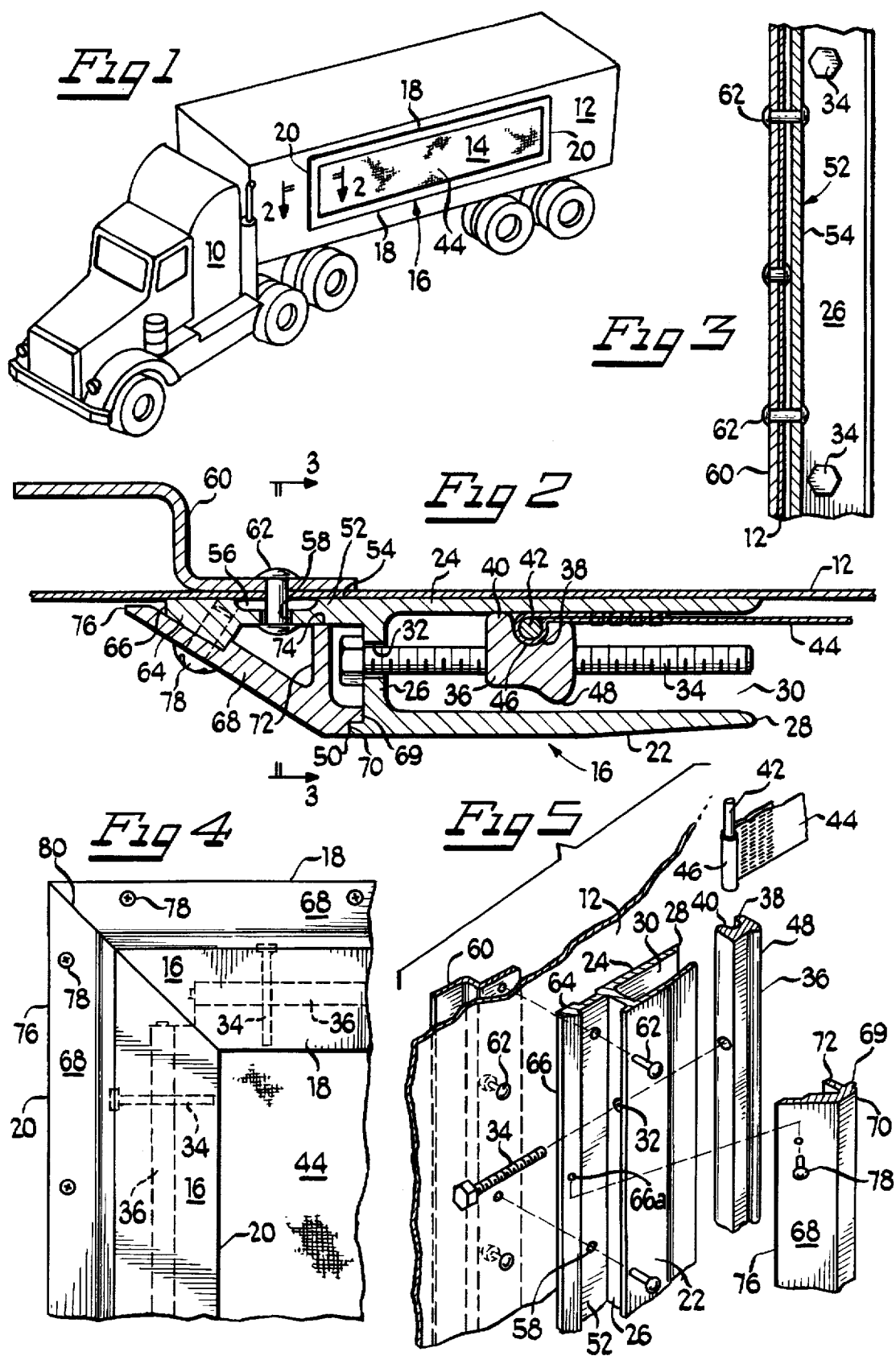

TRAILER SIGN FRAME

The invention relates to damage resistant signs which are mounted on truck bodies.

BACKGROUND OF THE INVENTION

Truck bodies, particularly truck trailers, often have their sides fitted with surface mounted signs. These signs are usually four sided, rectangularly shaped frames. They are designed to allow replacement of the sign which is constructed of a flexible sheet material such as canvas or plastic sheeting. These signs are mounted on the truck body by means of rivets or screws which pass through holes formed in the truck body's skin and supporting wall posts. While allowing for a firm mounting of the sign frame to the truck body, it makes the sign frame an almost integral part of the truck body.

Due to tight parking requirements in areas such as truck terminals and loading docks it is common for surface mounted sign frames to contact a raised surface located on the side of another truck, on a building or other vertical structure which may cause serious damage to the sign, to the truck body and the supporting wall posts of the truck body. Depending upon the force involved the sign can be rendered useless, the body torn and the wall posts bent. If it were possible to design a surface mounted truck body sign which was more resistant to damage of the type described an advance in the art would be afforded.

BRIEF SUMMARY OF THE INVENTION

In its broadest aspect the invention comprises a surface mounted truck body sign which is rendered less subject to damage by fitting to the frames of these signs with a protective beveled molding. In a preferred embodiment of the invention, the molding is mounted on the sign's frame. In more specific embodiments of the invention it relates to an improved damage resistant truck sign system which comprises a four sided surface mounted frame on the side of a truck body. This frame is formed of rails and stiles having a top, bottom, back and a front channel which extends the length of the rails and stiles. These channels are opposed when the rails and stiles are assembled into the four sided surface mounted frame. Within the channels there is positioned a loose fitting jaw shaped bar. It extends throughout a substantial portion of the length of the channels with the jaw being contoured to receive and engage a rod which is fitted about the edges of a sign made of a flexible sheet material.

The assembly described also contains adjusting means for urging the loose fitting bar and the engaged sign towards the back of the channels. The adjusting means usually are elongated bolts extending through the back of the rails and stiles and mate with a threaded opening in the jaw shaped bar. Signs of this type are rendered more resistant to damage by the use of a protective beveled molding fitted against the top back edge of the rails and stiles and the side of the truck body.

In a preferred embodiment of the invention, the bottom of the rails and stiles of the four sided frame are flanged for mounting the frame to the side of a truck body. The flange terminates in the shape of an upwardly and outwardly angled shoulder having on its top a pad for mounting and supporting the molding. The base of the flange is preferably arched. The top back edge of the rails and styles have a lip. The molding has a longitudinal groove located along its top edge shaped to mate with the lip on the back edge of the rails and stiles.

The molding also contains a downwardly projecting support rib located on the back of the molding adjacent and running parallel to the longitudinal groove. This support rib is dimensioned to rest on the top of the flange. By using this mode of construction the protective beveled molding is secured only to the frame. By not being mounted to the truck body, possible damage to the truck body is minimized.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF THE DRAWINGS

A fuller understanding of the foregoing may be had by reference to the accompanying drawings, wherein:

FIG. 1 is a perspective view of a truck having the sign system of the present invention mounted thereon;

FIG. 2 is a horizontal top view taken across the lines 2—2 of FIG. 1;

FIG. 3 is a vertical view taken across the lines 3—3 of FIG. 2;

FIG. 4 is a partial vertical view showing the sign system fitted with a protective beveled molding; and FIG. 5 is an exploded vertical view of a preferred sign system of the invention showing the various elements of its construction.

DETAILED DESCRIPTION OF THE PREFERRED EMBODIMENT OF THE PRESENT INVENTION

While the invention is susceptible of embodiment in many different forms, there is shown in the drawings and will be described herein in detail, a preferred embodiment of the present invention. It should be understood, however, that the present disclosure is to be considered an exemplification of the principles of the present invention and is not intended to limit the scope of the invention and/or claims of the embodiment illustrated.

In FIG. 1 there is shown a trailer truck 10 having mounted on the side 12 of the trailer the sign system 14 of the invention. The specific details of construction of the sign system 14 are shown to best advantage in FIGS. 2 and 5. The sign system 14 is composed of a four sided frame 16 which is formed of rails 18 and stiles 20. The rails 18 and stiles 20 are identical in construction, having a top 22, a bottom 24, and a back 26. The front 28 of the rails and stiles is open thereby defining channel 30.

The back 26 of the rails and stiles are drilled to provide spaced apart openings 32 which receive bolts 34. These bolts extend a substantial distance into the channel 30 where they are threaded onto an elongated bar 36 which fits freely into the channel and whose length is only slightly shorter than the length of the channel. The bar has threaded holes 38 which are dimensioned and spaced to receive bolts 34. The top of bar 36 is formed into jaw 40 which is shaped so as to receive and engage rod 42 which attached to the bottom of sign 44 by being threaded through hemmed loop 46. The bottom of the elongated bar 36 optionally contains shoulder 48 which allows the elongated rod to freely move within the channel 30 without chattering. When the bolts are tightened they draw the edges of the sign 44 into the channel 30 thus making the sign taught and wrinkle free.

The back edge of top 22 of the rails or stiles extends slightly beyond back 26 to form lip 50. The back edge of the bottom 24 of the rails and the stiles extends beyond back 26 to form mounting flange 52. The bottom side 54 of the flange 52 contains arch 56 which adds strength to the flange and allows for easy drilling of mounting holes 58 which mate with corresponding holes drilled into the side of the trailer 12 at a point behind a trailer wall post 60. The flange 52 is easily mounted to the side 12 of the trailer by using pop rivets 62. The end of flange 52 terminates in the shape of an upwardly and outwardly angled shoulder 64 at the top of which is angled pad 66.

Covering back 26 and flange 52 of the rails 18 and stiles 20 is beveled molding 68. The leading edge 69 of the beveled molding contains a longitudinal groove 70 which is shaped to mate with lip 50. The bottom side of the beveled molding contains a downwardly projecting support rib 72 which is positioned adjacent to and runs parallel with longitudinal groove 70. The bottom 74 of support rib 72 rests on the top of flange 52. Beveled molding 68 is sufficiently wide to allow trailing edge 76 to fit against the truck body side 12. The beveled molding 68 is affixed to the assembled four sided frame 16 by engaging the longitudinal groove 70 with lip 50 and by screws 78 which are fastened into bores 66a of pad 66. To provide a pleasant finished appearance to the sign system it is desirable to miter the ends 80 of the beveled moldings 68.

The rails 18 and stiles 20 which make up the frame are readily formed from aluminum. Steel may be used but it is less desirable due to its weight as well as possible galvanic corrosion problems when the truck body is fabricated from aluminum. The beveled moldings 68 may be fabricated of the same material of construction as the frame or high density plastics may be used.

When the sign system 14 of the present invention is mounted on a truck body and contacts an irregular surface the beveled molding 68 tends to glance off or graze such surfaces. This prevents such surfaces from hooking into the sign frame 16 and causing it to be dislodged from the side of truck with resultant damage to the sign frame, the side of the truck and the wall post being averted. If the beveled molding is damaged, it is easily replaced.

An important concept of the present invention resides in the fact that the beveled molding 68 is mounted on the frame 16 and not to any part of the truck body. This feature tends to prevent any damage from occurring to the body of the truck or its wall posts.

It is to be understood that the embodiments herein described are merely illustrative of the principles of the present invention. Various modifications may be made by those skilled in the art without departing from the spirit or scope of the claims which follow.

What is claimed is:

1. A vehicle sign frame for displaying a sign on a side of a vehicle, comprising:
    a frame for mounting on said side of said vehicle wherein said frame includes a plurality of rails and stiles each having a back end, a rear surface an outermost portion and defining a front opening;
    means for protecting said frame extending outward of said frame from a position adjacent said frame;
    means for attaching said means for protecting to said frame; and
    means for supporting said means for protecting comprising a pad having a surface extending at an oblique angle with respect to the rear surface and abutting said means for protecting along a portion thereof for supporting said means for protecting and absorbing impact imparted thereto.

2. The sign frame of claim 1, wherein said frame has an outermost portion, said means for protecting said frame is a beveled molding adapted to extend from said outermost portion to said side of said vehicle, said pad is beveled to be in substantial contact with said means for protecting along said portion thereof and said pad adapted to extend from said back end adjacent to said vehicle.

3. The sign frame of claim 2, wherein each of said rails and stiles include a mounting flange extending from said back end for mounting said rails and stiles to said vehicle.

4. The sign frame of claim 3, wherein said means for protecting said frame is mounted to at least one of said mounting flange and covers at least one of said back end of said plurality of rails and stiles.

5. The sign frame of claim 4, wherein said beveled molding is adapted to extend from a top edge of said back end of said plurality of rails and stiles to said vehicle.

6. The sign frame of claim 5, wherein said beveled molding includes a support rib extending perpendicular to said back end of said plurality of rails and stiles and abutting a top surface of said mounting flange.

7. The sign frame of claim 4, wherein said mounting flange includes a shoulder, said means for protecting being mounted to said shoulder.

8. The sign frame of claim 7, wherein said beveled molding is adapted to not be directly mounted to said side of said vehicle.

9. The sign frame of claim 1, wherein said frame has an outermost portion, said means for protecting said frame extending at an angle radially from said outermost portion of the frame.

10. A damage resistant truck sign system for mounting to a side of a truck body, said sign system comprising:
    a four sided frame for mounting on a surface of a side of a truck body, said frame being formed of a plurality of rails and stiles having a length, said rails and stiles each having a top, a bottom, a back having a rar surface and a front channel extending the length of the rails and stiles, said front channels being opposed when said rails and stiles are assembled into the four sided surface mounted frame;
    a loose fitting jaw shaped bar for holding a sign having edges, said jaw shaped bar being contained within the channels and extending throughout a substantial portion of the length of the channels, said jaw shaped bar being contoured to receive and engage a rod which is fitted about the edges of the sign made of a flexible sheet material;
    adjusting means for selectively urging the jaw shaped bar with the engaged sign towards the back of the rails and stiles; and
    a protective beveled molding fitted against the frame and adapted to extend from the top back edge of each of the rails and stiles and to the side of the truck body
    a shoulder extending from the back of said rails and stiles and adapted to be adjacent said truck body wherein said shoulder has a surface at an oblique angle with respect to the rear surface, said beveled molding being supported by said shoulder along a portion of said beveled molding.

11. The sign system of claim 10, wherein the molding is fastened to the frame.

12. The sign system of claim 10, wherein the bottoms of the rails and stiles of the four sided frame include a flange having a base for mounting the frame to the side of a truck body, and the tops of the rails and stiles have a lip.

13. The sign system of claim 12, wherein the base of the flange is arched.

14. The sign system of claim 12, wherein the molding has a longitudinal groove located along its top edge, said longitudinal groove shaped to mate with the lip on the tops of the rails and stiles, said molding also including a downwardly projecting support rib located on a bottom surface of the molding adjacent and running parallel to the longitudinal groove, said support rib configured to rest on the top of the flange.

15. The sign system of claim 12, wherein said moldings have ends, said ends being mitered to form corners.

16. A method for protecting a surface mounted sign frame mounted on a side of a truck from damage, wherein said frame includes a plurality of rails and stiles each having a back end, a rear surface, and a pad having a surface extending at an oblique angle with respect to the rear surface, an outermost portion and defining a front opening, said method comprising the steps of:

fitting said frame with a protective beveled molding extending at an angle from said side of said truck to said outermost portion of said sign frame and extending substantially contiguous with said oblique angled surface of said pad to be supported thereby.

17. The method of claim 16, wherein the molding is fastened to the frame.

18. The method of claim 16, further comprising the steps of:

providing said frame with a mounting flange;

providing said mounting flange with a shoulder;

providing said shoulder with a mounting surface; and fastening said protective beveled molding to said mounting surface.

19. An apparatus for mounting a sign to a mounting surface, said apparatus comprising:

a frame member having sides, a rear surface, outermost portions and a pad extending at an oblique angle with respect to the rear surface and adapted to extend outward from said frame member adjacent to said mounting surface; and a protective member mounted proximate said sides of said frame member and adapted to extend outward at an angle from said outermost portions, along said oblique angled pad to said mounting surface.

20. The apparatus of claim 19, wherein said frame member further includes a mounting flange extending outward from said sides for mounting said frame member to said mounting surface.

* * * * *